United States Patent

Nimri et al.

[11] Patent Number: 5,990,931
[45] Date of Patent: *Nov. 23, 1999

[54] AUTOMATIC DISPLAY UPDATE OF STILL FRAME IMAGES FOR VIDEOCONFERENCING

[75] Inventors: Alain Nimri; Michael Lee Kenoyer, both of Austin, Tex.

[73] Assignee: VTEL Corporation, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/826,900

[22] Filed: Apr. 9, 1997

Related U.S. Application Data

[60] Provisional application No. 60/015,160, Apr. 10, 1996.

[51] Int. Cl.$^6$ .................................................. H04N 7/14
[52] U.S. Cl. .............................. 348/15; 353/121; 345/330
[58] Field of Search .......................... 348/96, 700, 701, 348/143, 97, 15, 100, 154, 409, 421, 13, 14; 353/122, 121, 112, 113; 209/3.3; 40/361; 395/114; 364/189; 345/330, 331, 332; 709/200.07, 200.1

[56] References Cited

U.S. PATENT DOCUMENTS

| | | | |
|---|---|---|---|
| 4,679,077 | 7/1987 | Yuasa et al. | 348/154 |
| 4,693,373 | 9/1987 | Lamb et al. | 209/3.3 |
| 4,876,597 | 10/1989 | Roy et al. | 348/143 |
| 4,965,753 | 10/1990 | Kraemer | 345/421 |
| 5,428,417 | 6/1995 | Lichtenstein | 353/122 |
| 5,719,643 | 2/1998 | Nakajima | 348/700 |
| 5,754,700 | 5/1998 | Kuzma | 348/409 |
| 5,767,897 | 6/1998 | Howell | 348/15 |

*Primary Examiner*—Bryan Tung
*Assistant Examiner*—Gims Philippe
*Attorney, Agent, or Firm*—Baker & Botts, L.L.P.

[57] ABSTRACT

A method and apparatus to be used for videoconferencing when the presentation is to include displays of documents or other visuals. A camera is focused on the document and detects when the document is being handled by the presenter. It automatically determines when to initially display the document, as well as when to update frames of data representing the document.

25 Claims, 4 Drawing Sheets

AUTOMATIC DISPLAY UPDATE OF STILL FRAME IMAGES FOR VIDEOCONFERENCING

RELATED PATENT APPLICATIONS

This application claims priority under 35 U.S.C. § 119(c)(1) of provisional application Ser. No. 60/015160 filed Apr. 10, 1996.

TECHNICAL FIELD OF THE INVENTION

The present invention relates generally to videoconferencing systems, and more particularly to an improved method of previewing and presenting still frame images, such as images of documents, with a videoconferencing system.

BACKGROUND OF THE INVENTION

Technical advances in recent years have made video videoconferencing a cost effective and increasingly widespread alternative to physical face-to-face meetings. In a typical long-distance video conference, the participants at each station transmit and receive audio and video signals that allow the participants to see and hear each other. In a general sense, a videoconference may also be at a single site, such as a lecture hall, where the audience views a display.

Some videoconferencing stations include a document stand for providing a video signal of a document to be displayed on a monitor as part of the videoconference. A single image of a document is captured for transmission from video provided by the document stand's camera. More technically speaking, a video frame is converted to a frame of data and transmitted as a "slide".

A video conference may include supporting materials other than documents. For example, it may be desirable to present a computer screen display by transmitting the image data from which the display is generated to a larger on-site monitor for audience viewing or to an off-site monitor. Or, it may be desired to present material written on a whiteboard. This could be accomplished with video from a camera viewing the whiteboard, with the video being converted to a frame of data that is transmitted as a slide.

As indicated by the above examples, although the source material may vary, most video videoconferencing systems have at least one means for presenting supporting materials. A general term for such presentations is "still frame images". The slide of the document or other supporting material is a motionless image, and is typically displayed with higher resolution than the video images.

Most videoconferencing systems have a "preview" mode as well as a "slide" mode. In the preview mode, the presenter and perhaps his audience can view a video image of the item being presented as it is being positioned, annotated, or otherwise prepared for discussion.

In the past, both the slide presentation mode and the preview mode have required action on the part of the presenter. The presenter must remember to send the slide at the appropriate time, such as when he or she has finished positioning or annotating the document. If there is a preview mode, the presenter must remember to switch to preview and back to himself when the preview is over and the formal presentation is to begin.

SUMMARY OF THE INVENTION

An advantage of the invention is that it facilitates presentation of documents, whiteboards, or computer screens during a videoconference. The presenter is relieved of the burden of activating new slides when a the document, whiteboard, computer screen changes. Instead of requiring the presenter to manually activate a new slide, the video conference system detects changes and automatically sends the new slide.

The invention permits a seamless interplay of video of the presenter and still images of documents or other supporting material. These supporting materials may be presented clearly and accompanied by concise narrative without interruptions due to the presentation process.

Presentation of documents during a videoconference is accompanied with the same ease of use as with an overhead projector. The telecommunications aspects of the presentation are invisible to the user.

The invention is especially useful for informal document presentation, where the both the audience and the presenter preview the document. In manual systems, the presenter must switch the near camera from himself to the document for both the near and far preview displays. When the document is ready for a slide presentation, the presenter must remember to switch the camera back to himself as he discusses the document or goes on to another subject. This step is often forgotten, and the audience views a still slide and a video slide of the same document with no view of the presenter, which can spoil the effect of an otherwise professional presentation. The invention avoids this by handling camera switching automatically.

DETAILED DESCRIPTION OF THE INVENTION

Figure 1:
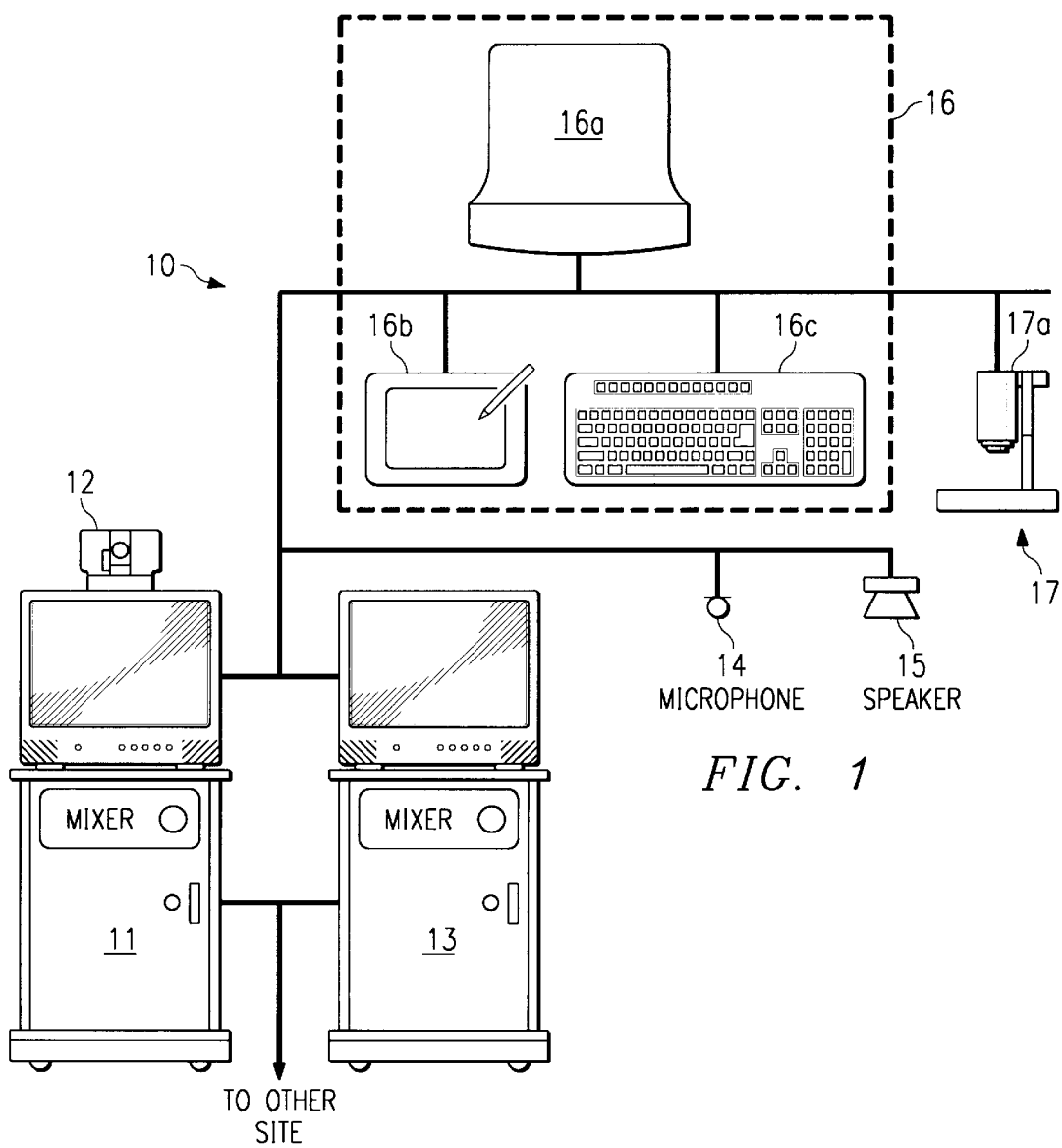
FIG. 1 illustrates the basic components of a video videoconferencing station.

FIG. 1 illustrates the basic components of a video videoconferencing station 10. For purposes of this description, it is assumed that station 10 is in data communication with at least one other similar station at remote ("far") site. To this end, station 10 may be coupled directly to another station (point-to-point communication) or coupled through a central switch such as a multi point unit (multi point communication). In other applications, such as for lecture halls and classrooms, there might be only one site. In this case, station 10 could be used for presentations to on-site participants.

A first monitor (left monitor) 11 displays a video picture of the far scene (the remote conference site), as captured by a camera at that location. A second monitor (right monitor) 13 displays "still frame images", such as a computer screen or document. The images may have been transmitted from the far site or originate at the near site. Monitor 13 may also be used to preview a document or other item prior to display as a slide. It should be understood that the selection of which monitor 11 or 13 (right or left) is used to display a particular scene is by convention and either monitor 11 or 13 could switchable or dedicated to display any of these scenes. Also, it would be possible to use only one monitor 11 or 13 and to switch it between scenes or provide a picture-in-picture (PIP).

Camera 12 may be a "staring" or "tracking" camera, depending on the sophistication of station 10. A microphone 14 generates audio information at station 10 and a speaker 15 conveys audio information from the far location. There may be multiple microphones or speakers, depending on the sophistication of station 10.

Control of station 10 and data communication with other stations is performed with various types of control and communications circuitry 16. Control and communications circuitry 16 may be implemented with personal computer equipment, although other processor-based equipment could be used. A computer 16a is programmed to execute various control functions, such as the camera view, audio control, or transmission of data files. Computer 16a may be a PC-type general purpose computer, or may be a dedicated processing device, or may a workstation on a network. An example of a suitable computer 16a is a personal computer having an Intel 486 processor. Such a computer 16a, with a WINDOWS type user interface but without the document presentation features of the present invention, is described in U.S. patent application Ser. No. 08/399,610, entitled "Method and Apparatus for a Video Conference User Interface", incorporated herein by reference. The user may generate inputs to the various components of station 10 through an input device such as a keyboard 16c or a control pad 16b. Other input devices (not shown) such as a trackball device (mouse), light pen, or touch screen could be used.

A document stand 17 generates images of a document to be presented during a video conference. Document stand 17 has a camera 17a, which provides a video signal representing an object placed in the stand. An example of a suitable document stand 17 is the ELMO 368.

For purposes of example, the following description is mostly in terms of presentation of documents. Station 10 automatically previews and presents documents placed in the document stand 17. As explained below, computer 16a is programmed to monitor the image data from camera 17a. Computer 16a automatically initiates a preview image at the near side and sends slides to the far side when the image changes. The same concepts apply to any object of a size and shape suitable for presentation via document stand 17. Furthermore, the same concepts apply to presentation of anything desired to be presented as a "still frame images" display. Other such presentations might be of computer screens or electronic whiteboards, or of anything else that can be represented with frames of image data. For still frame image presentations, the image is previewed by the presenter before it is sent. During the preview, monitor 13 displays a video image of the document to be presented. However, for actual presentation of the document, it is preferable for the document to be displayed as a still picture (a "slide"). This facilitates its readability. If the document changes, such as by being replaced, repositioned, zoomed, or annotated, a new slide is sent and displayed to the audience. Also, as explained below, an informal mode can be used, during which, both the presenter and the audience see a preview display of the document. The particular configuration of the videoconferencing system determines whether the preview and presentation displays are on two different monitors, on a single switchable monitor, or on a single monitor with a PIP. For purposes of the invention, it is assumed that the near station 10 is capable of both a preview and a presentation display. For long-distance videoconferencing, there is also an off site station (not shown), which is capable of at least a presentation display and perhaps a preview display.

Figure 2:
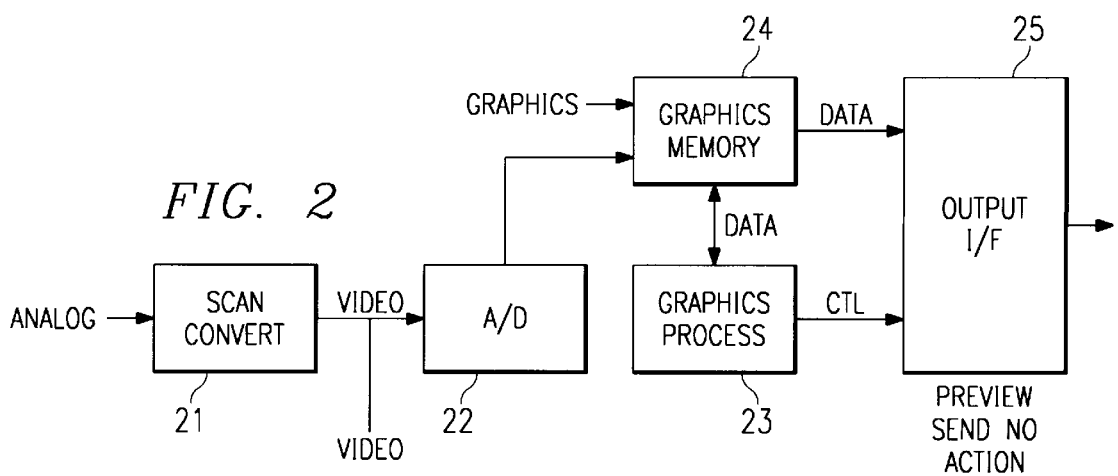
FIG. 2 illustrates various components of the computer of FIG. 1 used to implement the invention.

FIG. 2 is a block diagram of various components of computer 16a. Only those components relevant to still frame image presentations are shown—in a typical videoconferencing station 10, computer 16a has other components used for other video videoconferencing functions. Also, processor 23 may perform other processes than those described herein, such as decoding of incoming bitstreams and processing for picture quality.

The invention operates on a bitstream of image data, in frame sequential format. A typical frame rate is 30 frames per second. This data may arrive at computer 16a in the proper digital format and be directly stored in image memory 24. Or, computer 16a may receive an analog signal, in which case computer 16a has an analog-to-digital converter 22 for converting the signal to data. If the analog signal is not in the proper format, a scan converter 21 may be used to provide an analog signal with the proper format. The inclusion of scan converter 21 and analog-to-digital converter 22 are a function of the type of signal acquired to obtain a picture of the object to be presented. As stated above, this description is in terms of a document stand 17 having a camera 17a that provides an analog signal. Other input signals might be a computer display signal, i.e., a VGA signal, a VCR signal, or some other type of digital or analog camera signal.

Regardless of the signal source, at some point, image memory 24 receives frames of "still frame image" data, representing images of the object to be presented. The data is processed by image processor 23, in accordance with the programming described below in connection with FIG. 3. As a result of executing this programming, processor 23 generates command signals that cause the document to be previewed, or to be sent as a slide, or takes no action. An output interface 25 handles output functions such as timing, coding, and format.

In the example of this description, processor 23 operates on pixel intensity value as obtained from the luminance component of a color difference (YUV) signal. However, the same process could be performed on RGB data, where each pixel has three values.

Figure 3A:
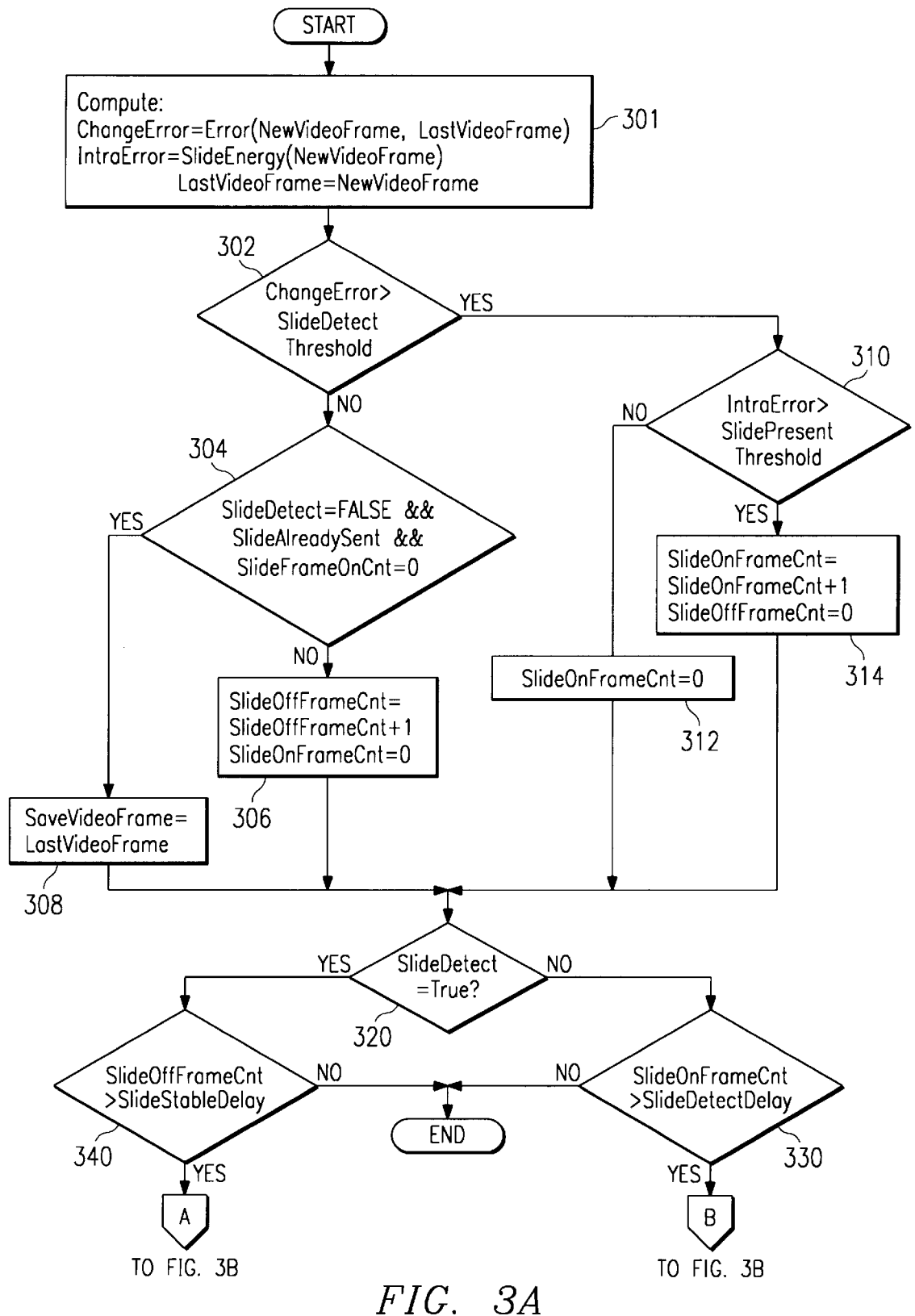
FIG. 3 illustrates a detailed example of programming executed by the processor of FIG. 3 for a "preview and presentation" videoconferencing system.
Figure 3B:
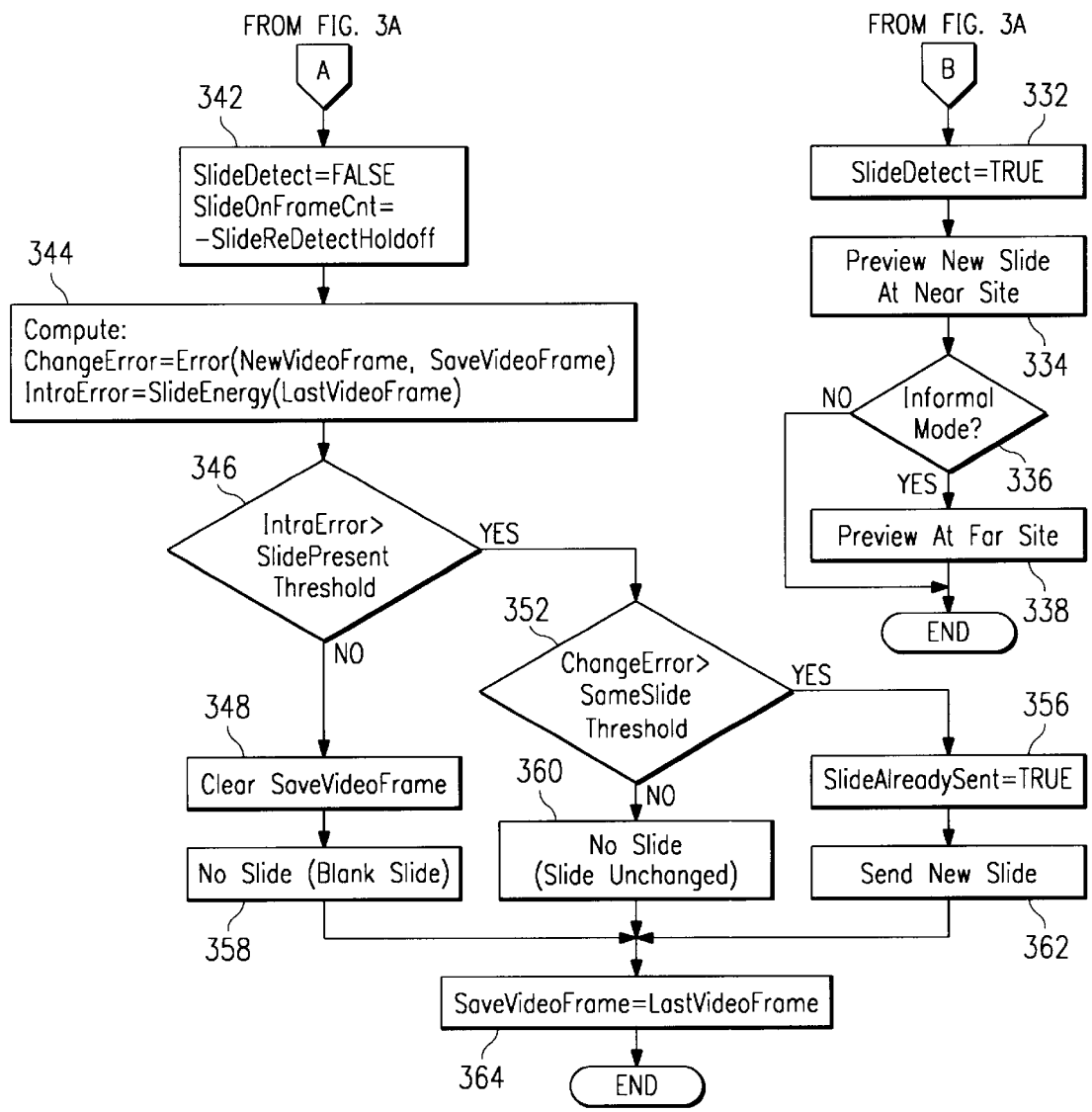

FIG. 3 is a flow diagram of an example of the display update process executed by processor 23. The method of FIG. 3 is for a system such as system 10, which permits previews as well as presentations. FIG. 3 is a specific implementation, as compared to FIG. 4, which is a simplified diagram of the basic steps of the process as executed by either a "presentation only" or a "preview and presentation" videoconferencing system. The process operates on frames of image data. As each new frame is received, the process is repeated. A typical frame rate is 30 frames per second, but other frame rates are possible. Also, the method need not operate on every frame; it could operate on selected frames, such as every other frame.

Referring specifically to FIG. 3, each iteration of the process results in a control signal that determines whether the document will be previewed, sent as a slide, or no action is to be taken. After one frame is processed and a decision made (preview, send, or no action), a next frame undergoes the same process on a continuous basis for so long as processor 23 is receiving an input signal.

Using the example of document presentation with a document stand 17, the process begins when camera 17a is switched on and continues so long as it delivers a signal to processor 23. The invention could be extended to multiple sources. For example, a "round robin" approach could be used to monitor a whiteboard camera in addition to document stand camera 17a.

As explained below, processor 23 makes various decisions based on frame-to-frame change values, intraframe intensity values, and certain counted values. The first two values are referred to herein as "error" values. A "change error" value indicates whether a frame has changed from the previous frame. An "intraframe error" value indicates whether or not the frame is blank. The counted values create delays that prevent the process from being too sensitive to inconsequential changes, such as an inadvertent hand movement. These counted values ensure that a predetermined number of iterations occur before a slide is previewed or sent.

Step 301 involves evaluating the incoming frame (NewVideoFrame) to determine if it has changed and if it is merely a blank frame. Change is determined by comparing pixel values with those of the previous frame (LastVideoFrame). A change in pixel values (ChangeError) indicates that the document has moved, has been annotated, or for some other reason appears different in the view of camera 17a. The difference value (ChangeError) can be obtained by any type of method for detecting inter-frame change. A common method for detecting such change is a motion detection algorithm. The existence of a blank frame is determined by the energy level of the frame (IntraError).

In the example of this description, both ChangeError and IntraError are determined by calculating blocks of pixel values. Each block has 16×16 pixels. The pixel values are intensity values, ranging from black to white.

A feature of the invention is that each pixel value is computed as a difference from an average pixel value over its block. Thus, where i=1, 2 . . . 16, and j=1, 2, . . . 16, for a 16×16 block of pixels, each pixel value is $x_{ij}-\bar{x}_{ij}$. The difference value for the block is expressed mathematically as:

$$\text{ChangeError} = \Sigma[|x_{ij}(t_1) - \bar{x}_{ij}(t_1) - x_{ij}(t^2) - \bar{x}_{ij}(t_2)|]$$

where $t_1$ and $t_2$ identify two frames in terms of their separation in time, i.e., $t_1$ is a frame at a first time and $t_2$ is a frame at a second time. The intensity value for the block is expressed mathematically as:

$$\text{IntraError} = \Sigma[|x_{ij} - \bar{x}_{ij}|]$$

Block values are then used to obtain a value representing change in the frame.

An advantage of subtracting average values is that the process does not respond to changes that are due merely to illumination. For example, if the ambient illumination in the conference room changes, neither ChangeError not IntraError would indicate that the document has changed. More specifically, assume that a frame has an average value, $\bar{x}_{ij}$, normalized to 0.6 and that a particular pixel has a value of 0.7. If the ambient illumination changes by 0.1, the pixel value increases but so does the average value, so that the pixel value for purposes of computing IntraError and ChangeError is still 0.1.

After ChangeError and IntraError are computed, NewVideoFrame becomes LastVideoFrame in preparation for the next iteration of the process.

In Step 302, processor 23 determines whether ChangeError is greater than the SlideDetectThreshold. This thresholding step accommodates noise to eliminate false triggering of a preview or new slide.

A ChangeError less than the SlideDetectThreshold indicates that the document has not changed. If this is the case, in Step 304, processor 23 determines whether three conditions exist: SlideDetect is false, SlideAlreadySent is true, and SlideFrameOnCnt is zero. As explained below, these values will have been set by a previous iteration. SlideDetect is false if the document has not been previewed as a result of a previous iteration. SlideAlreadySent is true if the document has been sent as a slide.

The existence of all three conditions evaluated in Step 304 indicates that a frame with the same image has already been previewed and sent. In this case, in Step 308, processor 23 saves the frame as SaveVideoFrame. Thus, even if a new slide is not to be sent, the most recent frame is saved.

If not all of the conditions of Step 304 exist, in Step 306, processor 23 increments an "off" count (SlideOffFrameCnt) and sets an "on" count (SlideOnFrameCnt) to zero. As indicated below, these counts are frame counts. The "on" count tracks how long the process is detecting changing frames, and helps determine whether a preview should be initiated. The "off" count tracks how long the process is not detecting changing frames, and helps determine whether a slide should be initiated. Thus, in a general sense, these "on" and "off" count values are used to indicate how long successive frames have changed or not changed, respectively. Step 306 is only reached when the frame has not changed, so the off count increments.

Referring back to Step 302, a ChangeError greater than the SlideDetectThreshold indicates that the document is different. In this case, in Step 310, processor 23 determines whether IntraError is greater than the SlidePresentThreshold. If not, a blank frame is indicated, and in Step 312, processor 23 sets SlideOnFrameCnt to zero. If so, detection of a new slide is indicated, and in Step 314, processor 23 increments SlideOnFrameCnt and sets SlideoffFrameCnt to zero. As explained below, the slide will not be previewed until the number of increments resulting from repeated iterations of Step 314 satisfies a pre-preview delay.

In Step 320, processor 23 determines whether SlideDetect is true. As explained below, this value will have been set to true by a previous iteration in which a frame was previewed. In other words, Step 320 determines whether the process is in a preview mode.

If SlideDetect is not true, in Step 330, processor 23 determines whether SlideOnFrameCnt is greater than SlideDetectDelay. In previous steps, the "slide on" count is incremented when the frame has changed and is not blank. If the preview delay is satisfied, in Step 332, processor 23 sets SlideDetect to true. In Step 334, processor 23 generates a preview command signal to cause the image to be displayed as a preview on monitor 13. The same command signal can be used for an informal presentation, where the preview signal is also delivered to a monitor at the far site. If SlideFrameOnCnt is not greater than SlideDetectDelay, the current iteration ends.

If SlideDetect is true, which indicates that the system is already in a preview mode, in Step 340, processor 23 determines whether SlideOffFrameCnt is greater than SlideStableDelay. This step determines whether it is time for a slide to be sent. In previous steps, this "slide off" frame count will have been incremented when the frame has not changed. If the delay has not lapsed, the current iteration ends. If the delay has lapsed, which indicates that a frame being previewed is not moving, in Step 342, processor 23 sets SlideDetect to false. It also sets SlideOnFrameCnt to a ReDetectHoldoff value, which is negative so as to increase the time that must elapse before the system re-enters a preview mode.

In Step 344, processor 23 recomputes ChangeError and IntraError. The ChangeError value may or may not be the same as in Step 301. The comparison is to the last slide that was detected.

Step 346 determines whether IntraError is greater than SlidePresentThreshold. This determines whether the frame is blank. If the frame is blank, in Step 348, SaveVideoFrame is cleared. No slide is sent.

If IntraError is greater than SlidePresentThreshold, indicated that the slide is not blank, in Step 352, processor 23 determines whether ChangeError is greater than SameSlideThreshold. This determines whether the frame is changed. If it has not, no slide is sent. If it has, in Steps 356 and 358, SlideAlreadySent is set to true. Processor 23 generates a control signal causing the slide to be transmitted for viewing by the presentees.

In step 364, which occurs unless the process is in the preview mode, the last frame is copied to the saved frame. This permits each potential new slide to be compared with the last slide.

Figure 4:
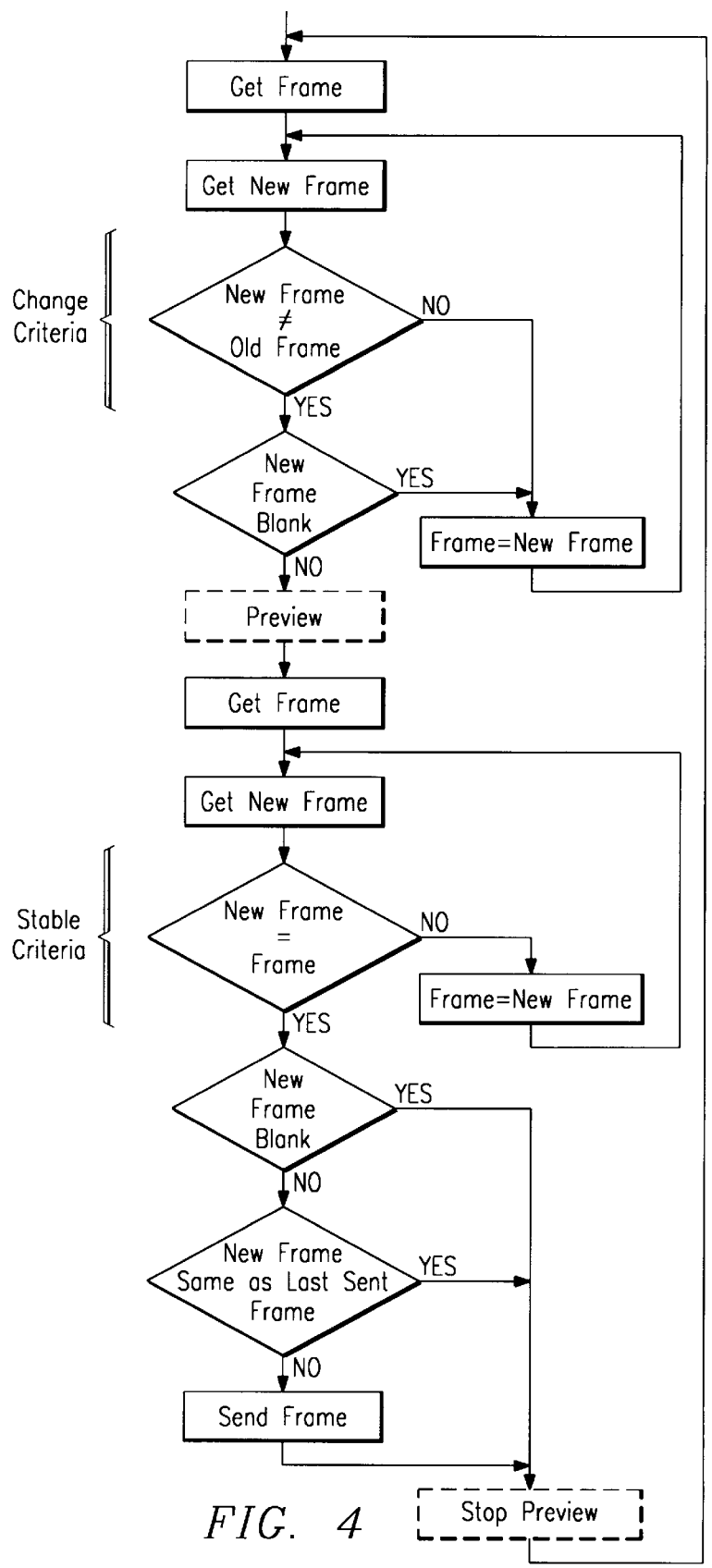
FIG. 4 illustrates the basic steps of the method, as implemented on a "presentation only" or on a "preview and presentation" videoconferencing system.

FIG. 4 is a diagram of the basic steps of the invention. The dotted steps indicate steps that are added for a videoconferencing system that previews documents (or other objects) as well as presents them. In other words, the method of the invention is useful with a system that presents documents but does not necessarily preview them. The steps of FIG. 3 correspond to some of the steps described above, and the same general description applies to corresponding steps.

The methods of FIGS. 3 and 4 have a number of common features. Given the basic concept of automatically detecting change in the document or other item being presented and using this information to make a decision whether to automatically present a new slide, other features are independent of each other. One such feature is that changes in the document or other object are evaluated for their "significance". In other words, the change is not merely a change in overall lighting. In computer screen presentations, a significant change may be one that is not merely a movement of the cursor or of some other non-substantive object. In a system that provides previews, the change is a prerequisite to a preview. In a presentation-only system, the change is a prerequisite to further evaluation prior to presentation. In both systems, a frame representing a change qualifies for presentation if the change is also "stable". In other words, the changed document or other object is not changing anymore. A stable change is ensured by delaying the presentation until there is no change for a predetermined number of frames. Even when it is determined that a frame represents a significant and stable change, prior to presentation, the frame is further evaluated to make sure that it has not already been sent as a slide and that it is not merely a blank frame. All of this processing is transparent to the presenter, who is free to move, annotate, and otherwise change the object being presented, without manually activating previews or presentations.

The process described above in connection with FIGS. 3 and 4 can be enhanced for presenting computer screens. Cursor movement can be ignored for purposes of determining whether to send a new slide. Changes that occur within a small area matching the area of the cursor icon can be ignored. Other objects, such as "hourglass" timer icons, can similarly be ignored. Either changes in location or appearance can be ignored as desired. This "object disregard" feature is accomplished by appropriate modifications to the algorithm that detects the change error.

A further enhancement, which is especially useful for computer screen presentations, is the ability to continue a "live" video display at the near site for the presenter's use while detecting and transmitting slides for display to an audience. Once a significant change is detected and after a "slide stable" delay, processor 23 generates a control signal to transmit a slide to the audience's display only.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A computer-implemented method of using a processor to automatically present graphics slides as still displays on a videoconferencing system, said videoconferencing system having a processor that receives frames of graphics data, comprising the steps of:

detecting a change between a current frame and a previous frame;

comparing any said change to at least one significance criterium to determine whether said current frame should be displayed as a new slide;

repeating the above steps for a next frame without displaying said frame as a new slide, if said significance criterium is not met;

transmitting said frame to be displayed as a new slide, if said significance criterium is met; and generating a control signal to said videoconferencing system indicating whether said frame is to be displayed as said still image.

2. The method of claim 1, wherein said detecting step is performed with a motion detection algorithm.

3. The method of claim 1, wherein said detecting step is performed such that said change is not a change resulting from a change in overall intensity of said frames.

4. The method of claim 1, wherein said frames represent displays on a computer screen and wherein said significance criterium is based on a change to a predetermined object in said displays.

5. The method of claim 1, further comprising the step of repeating said detecting step for a number of frames, to determine that said change has continued for a predetermined number of frames, and wherein said determining step is further based on the results of said repeating step.

6. The method of claim 1, wherein said significance criterium is based on a noise factor.

7. The method of claim 1, further comprising the step of evaluating the intensity level of said current frame to determine whether said current frame is blank, and wherein said determining step is further based on the results of said evaluating step.

8. The method of claim 1, further comprising the step of comparing said current frame to a frame previously presented, and wherein said determining step is further based on the results of said comparing step.

9. A computer-implemented method of using a processor to automatically preview and present graphics slides as still displays on a videoconferencing system, said videoconferencing system having a processor that receives frames of graphics data, comprising the steps of:

detecting a change between a current frame and a previous frame;

comparing any said change to at least one significance criterium to determine whether said current frame should be displayed as a preview;

repeating the above steps for a next frame without displaying said frame as a preview, if said significance criterium is not met; and transmitting said frame to be displayed as a preview, if said significance criterium is met;

generating a control signal to said videoconferencing system indicating whether said frame is to be displayed as a preview; and determining whether to present a new slide, based on movement in said preview.

10. The method of claim 9, wherein said detecting step is performed with a motion detection algorithm.

11. The method of claim 9, wherein said detecting step is performed such that said change is not a change resulting from a change in overall intensity of said frames.

12. The method of claim 9, wherein said frames represent displays on a computer screen and wherein said significance criterium is based on a change to a predetermined object in said displays.

13. The method of claim 9, further comprising the step of repeating said detecting step for a number of frames, to determine that said change has continued for a predetermined number of frames, and wherein said determining step is based on the results of said repeating step.

14. The method of claim 9, said significance criterium is based on a noise factor.

15. The method of claim 9, further comprising the step of repeating said detecting step for a number of frames, to determine when said change is stable, and wherein said step of determining whether to present a new slide is based on the results of said repeating step.

16. The method of claim 9, further comprising the step of evaluating the intensity level of said current frame to determine whether said current frame is blank, and wherein said step of determining whether to present a new slide is based on the results of said evaluating step.

17. The method of claim 9, further comprising the step of comparing said current frame to a frame previously presented, and wherein said step of determining whether to present a new slide is based on the results of said comparing step.

18. An improved processor-implemented videoconferencing system that automatically presents graphics slides as still displays, the improvement comprising:

a processor that receives frames of graphics data, said processor being programmed to detect a change between a current frame and a previous frame, to compare any said change to at least one significance criterium to determine whether said current frame should be displayed as a new slide; to repeat the above steps for a next frame without displaying said frame as a new slide if said significance criterium is not met; to transmit said frame to be displayed as a new slide if said significance criterium is met; and to generate a control signal to said videoconferencing system indicating whether said slide is to be presented as said still image.

19. The system of claim 18, wherein said processor is further programmed such to detect said change when said change is not the result of a change in overall intensity of said frames.

20. The method of claim 18, wherein said processor is further programmed to repeatedly detect change such that it determines whether a new slide should be presented only after said change has continued for a predetermined number of frames.

21. The method of claim 18, wherein said processor is further programmed to repeatedly detect change such that it determines when said change is stable.

22. The method of claim 18, wherein said processor is further programmed to evaluate the intensity level of said current frame to determine whether said current frame is blank.

23. The method of claim 1, wherein said comparing step is accomplished by evaluating said change such that said still display is not affected by changes that are quantitized by said at least one significance criterium and that have a level not indicated during said comparing step.

24. The method of claim 9, wherein said comparing step is accomplished by evaluating said change such that said still display is not affected by changes that are quantitized by said at least one significance criterium and that have a level not indicated during said comparing step.

25. The system of claim 18, wherein said processor evaluates any said change such that said still display is not affected by changes that are quantitized by said at least one significance criterium and that have a level not indicated during said comparing step.

* * * * *